Patented Apr. 12, 1932

1,853,406

UNITED STATES PATENT OFFICE

JOHN N. CAROTHERS AND STEPHEN P. HUGER, OF ANNISTON, ALABAMA, ASSIGNORS, BY MESNE ASSIGNMENTS, TO SWANN RESEARCH, INC., OF BIRMINGHAM, ALABAMA, A CORPORATION OF ALABAMA

PROCESS FOR THE PRODUCTION OF PHOSPHORIC ACID AND CALCIUM ALUMINATE SLAG

No Drawing. Application filed February 28, 1927. Serial No. 171,721.

This invention relates to a process for the production of phosphoric acid, and comprises smelting a mixture of phosphate rock or any calcium phosphate compound, bauxite or similar alumina bearing materials, and carbon in an electric furnace; and simultaneously producing phosphoric acid and a calcium aluminate slag as an important and valuable by-product.

This invention further contemplates the addition of scrap iron or iron bearing material to the furnace charge to provide for the production of ferro-phosphorus as a second by-product when such is desired.

Our invention will have certain important commercial advantages, as it will enable phosphoric acid to be produced on a more economical basis than has heretofore been attained or deemed possible; it will improve the operation of an electric furnace over existing conditions whereby a practically valueless calcium silicate slag is produced; and it will make available for utilization alumina bearing ores not commercially usable heretofore in the production of a cementitious material. The quality of the acid is equal to that produced along with a calcium silicate slag, but, due to the value of the slag as a cementitious material, the cost of the acid is materially reduced. Our present process will improve the furnace operations in that the tendency of the silicious burden of the furnace to become crusted on the surface of the charge is not experienced with an alumina burden and thus we obtain a freer discharge of the evolved gases. In our present process we can use bauxite higher in silica than may be used when lime and bauxite are sintered for the purpose of producing calcium aluminate compounds intended for use as hydraulic and cementitious materials.

The process is briefly described, that those skilled in the art may practice it, as follows: Phosphate rock, of any commercial grade, though preferably of a low silica content, is mixed with bauxite, coke and, where desired, scrap iron and charged into an electric smelting furnace, where it is heated to a temperature at which a liquid slag forms, when the carbon reduces the phosphorous pentoxide ($P_2O_5$), combined with the lime in the phosphate rock, to elemental phosphorus ($P_2$) which emanates from the surface of the charge as such. This phosphorus may subsequently be oxidized to phosphorus pentoxide ($P_2O_5$), hydrated and collected as phosphoric acid; or, if desired, may be collected as elemental phosphorus. Some of the evolved phosphorus is absorbed by any iron present in the charge and phosphides of iron—ferro-phosphorus—are formed. The lime (CaO), which is combined with the phosphorus pentoxide ($P_2O_5$) in the phosphate rock, when freed from combination by the reduction of said phosphorus pentoxide ($P_2O_5$), combines with the alumina of the bauxite and forms calcium aluminum silicate, calcium silicate and calcium aluminate. The ferro-phosphorus and the slag are tapped from the furnace in a manner according to well known practice, and since the density of these two substances differs widely, a separation may be made by allowing them to flow into a receptacle and cool. The ferro-phosphorus will settle to the bottom and may be separated very satisfactorily when the entire mass has solidified.

The phosphate bearing material, the bauxite, and the carbon, are added to the furnace charge according to calculations from an analysis, in such proportions that sufficient carbon is added to first reduce the oxides of iron to metallic iron and then to reduce the phosphorus pentoxide ($P_2O_5$) to elemental phosphorus ($P_2$). Under certain conditions of furnace operation, characteristic of different units, some of the titanium oxide is reduced and titanium results. It is not understood fully what these conditions are; however, such have been found to exist, and this has an influence on the carbon requirement, necessitating varying additional quantities of carbon being added according to the needs of the particular furnace in question. The quantity required may be judged by the phosphorus pentoxide remaining in the slag. When sufficient carbon is present the phosphorus pentoxide remaining in the slag will be approximately 1.25%, and if this percentage is exceeded, it is indication of a deficiency of carbon in the burden.

The lime, alumina, and silica are computed as components of the charge in such proportions as to produce a slag melt containing the maximum quantities of calcium aluminate compounds having the following formula: $CaOAl_2O_3$, and $3CaO.5Al_2O_3$. The silica combines with lime and alumina to form calcium alumina silicates which have no hydraulic properties. The proportioning of the lime and alumina to form the desired calcium aluminate compounds, as referred to above, is predicated on approximately complete elimination of the phosphorus pentoxide from the phosphate rock, and such calcium aluminate compounds alone will possess the desired hydraulic and cementitious qualities, when finely ground and hydrated. Therefore, if the slag melt contain the maximum of the above referred to calcium aluminate compounds, the maximum ultimate hydraulic and cementitious properties are developed. Ordinarily, there is a small percentage of dicalcium silicate crystallized out with the calcium aluminate compounds, and while this is not desirable, its presence is not objectionable, because it possesses some hydraulic and cementitious qualities.

As an example of the charge which we employ in producing our new product, let it be assumed that the phosphate rock, bauxite and coke have the following analysis:

|  | Phosphate rock | Bauxite | Coke |
| --- | --- | --- | --- |
| $H_2O$ |  | 0.72% | 2.78% |
| $SiO_2$ | 6.88% | 4.59 | 0.19 |
| CaO | 47.86 | 0.79 | 1.48 |
| $Al_2O_3$ | 1.39 | 85.01 |  |
| MgO | 0.11 |  |  |
| $Fe_2O_3$ | 3.10 | 5.29 | 1.45 |
| $P_2O_5$ | 34.23 |  |  |
| $TiO_2$ |  | 3.60 |  |
| Fixed carbon |  |  | 89.82 |

With constituents of the charge analyzing as above outlined, the charge consists in substantially the following proportions:

|  | Pounds |
| --- | --- |
| Phosphate rock | 1000 |
| Bauxite | 600 |
| Coke | 204 |

With such a furnace charge of materials having the analysis assumed, a calcium aluminate slag having hydraulic and cementitious properties is produced. As before pointed out, however, the proportions of the charge will vary with the analysis of the materials, the essential being that the slag contain the maximum quantities of $CaO.Al_2O_3$ and $3CaO.5Al_2O_3$.

Bauxite suitable for this process may contain higher percentages of silica than suitable for use in the production of cementitious materials, as, for instance, when lime and alumina bearing materials are merely sintered in a rotary kiln. Coke of commercial grade is suitable for use in this process.

We are aware that U. S. Patent No. 1,000,290 discloses a process for making calcium aluminate and phosphorus pentoxide ($P_2O_5$); however, in that instance, it is proposed to merely heat phosphate rock and bauxite to a temperature where the acid action of the alumina replaces phosphorus pentoxide in combination with lime of the phosphate rock. We have found, by the addition of carbon to the charge, that it is possible to more completely eliminate the combined phosphorus pentoxide from the charge, due to the reducing action of the carbon, and to produce a more liquid slag, thereby obtaining higher yields of phosphorus from the phosphate rock; we produce a liquid slag not obtainable in the rotary fuel fired furnace, and thus we facilitate the removal of the slag from the furnace. Further, we have found that by using carbon in the charge and smelting same in an electric furnace, we are enabled to utilize raw materials having higher silica content than is possible with fuel without the use of carbon. We have also found in the operation of a rotary furnace where the temperature is sufficiently high to drive off phosphorus pentoxide from phosphate rock by replacement with alumina ($Al_2O_3$), that the material used in lining such a rotary is attacked by the phosphorus compounds and is very rapidly corroded. This action takes place so rapidly that in commercial units the cost of replacement becomes a serious matter.

In the production of ferro-phosphorus by the use of an electric furnace, when a change of phosphate rock, carbon, and silica is used, it is difficult to maintain a low percentage of silicon in the ferro-phosphorus. When an alumina burden is employed, this difficulty is not encountered, and the desired low percentage of silicon content in the ferro-phosphorus can be uniformly obtained. When an alumina burden is employed, there is some reduction of the titanium oxide in the bauxite, and this titanium is found in the ferro-phosphorus. It is believed that, all other factors being indentical, the presence of titanium will tend to form a denser and less friable ferro-phosphorus. This titanium may be as high as 1% Ti in the ferro-phosphorus without deleterious effect.

Having thus described our invention, what we claim as new and desire to secure by Letters Patent, is:—

1. In a process for making phosphoric acid, ferro-phosphorus and cementitious slag at one operation, the step which comprises, smelting a mixture containing phosphate rock, coke, iron bearing material, and bauxite at a temperature which will form a liquid slag, the phosphate rock, coke and bauxite being in proportions to produce a cementitious slag, and tapping the liquid by-products from the furnace.

2. In a process for the simultaneous production of phosphoric acid, ferro-phosphorus and calcium aluminate, the steps which consist in charging an electric furnace with a mixture of phosphate rock, iron bearing material, carbon and bauxite, the phosphate rock, carbon and bauxite being in proper proportions to form a slag having hydraulic properties, and smelting said mixture, and tapping ferro-phosphorus with cementitious calcium aluminate slag from the furnace, substantially as described.

In testimony whereof we affix our signatures.

JOHN N. CAROTHERS.
STEPHEN P. HUGER.